United States Patent
Meyers et al.

(10) Patent No.: US 8,219,106 B2
(45) Date of Patent: Jul. 10, 2012

(54) REVERSE LINK LOAD CONTROL

(75) Inventors: Martin H. Meyers, Montclair, NJ (US);
Alexandro Salvarani, Edison, NJ (US);
Carl F. Weaver, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 993 days.

(21) Appl. No.: 11/221,329

(22) Filed: Sep. 7, 2005

(65) Prior Publication Data
US 2007/0054671 A1  Mar. 8, 2007

(51) Int. Cl.
*H04W 72/00* (2009.01)
*H04W 4/00* (2009.01)
*H03C 1/62* (2006.01)

(52) U.S. Cl. .......... 455/453; 455/452.2; 455/115.2; 370/329; 370/332

(58) Field of Classification Search .......... 455/453, 455/452.2, 115.3, 115.2; 370/329, 332
See application file for complete search history.

(56) References Cited

U.S. PATENT DOCUMENTS

| | | | | |
|---|---|---|---|---|
| 4,670,899 A | * | 6/1987 | Brody et al. | 455/453 |
| 6,456,850 B1 | * | 9/2002 | Kim et al. | 455/453 |
| 6,591,110 B1 | * | 7/2003 | Kim et al. | 455/453 |

* cited by examiner

*Primary Examiner* — Ariel Balaoing
(74) *Attorney, Agent, or Firm* — Carlson, Gaskey & Olds PC

(57) ABSTRACT

A reverse link load control strategy utilizes a total call load metric in place of a reverse signal strength indicator metric for managing reverse link resources. In a disclosed example, a load control module (40) measures the reverse signal strength indicator (62) and measures an active cell load (64) using known techniques. A relationship between the reverse signal strength indicator, the active cell load, an other cell load component and a jammer component provides the ability to determine the other cell load component and the jammer component. Once the other cell load component has been determined, a total call load based upon the active cell load component and the other cell load component provides a useful metric for allocating reverse link resources between existing users and for determining whether to allow a new user, for example.

13 Claims, 1 Drawing Sheet

REVERSE LINK LOAD CONTROL

FIELD OF THE INVENTION

This invention generally relates to telecommunications. More particularly, this invention relates to wireless communications.

DESCRIPTION OF THE RELATED ART

Wireless communication systems are well known. Mobile stations, such as cell phones, laptop computers or personal digital assistants communicate with base stations that are part of a wireless communication network. As known, base stations are strategically placed to provide wireless communication coverage over selected geographic areas. A variety of control mechanisms are required to maintain useful and reliable communication between mobile stations and base stations. One area where appropriate control is required is maintaining the interference level on a reverse link, which corresponds to a link from the mobile stations to the base station, within acceptable levels to avoid interference that would degrade the quality of service for mobile subscribers.

One contribution to reverse link interference is the result of more than one mobile station transmitting signals to a base station on the carrier. This type of interference can be referred to as call load interference.

Mobiles in wireless networks communicate with base stations by transmitting on one of multiple frequency bands. The set of frequency bands allocated for transmission is called the frequency spectrum, which is owned by wireless service providers for commercial use. In CDMA and UMTS wireless networks, mobiles communicate with a base station by transmitting on a common frequency band that is shared by many mobiles. This frequency band is called the CDMA/UMTS carrier, and has the value of 1.25 MHz for IS-95A/B, CDMA-2000, 3G1x EVDO and 3G1X EVDV and the value of 3.84 MHz for UMTS, for example.

As users are added to a carrier, or existing users transmit at higher data lates in the same carrier, the level of interference measured at the base station increases. An increase of RF interference typically forces all active mobiles in the carrier to transmit at a higher power to maintain the quality of service of their respective links. Every time a new user is added, or a user transmits at higher data rate, the average power transmission of all the other users in the carrier increases to maintain their own quality of service. Mobiles that are transmitting near their maximum power suffer a degraded quality of service when new users are added to the carrier, or existing users in the carrier increase their rate of data transmission. This situation should be detected and preferably avoided to control and minimize the rate of call drops, maintain adequate data throughput to users, preserve the quality of service perceived by the mobile users, and preserve the reverse link coverage.

If the reverse link interference due to CDMA/UMTS mobiles increases to very high values, generally the reverse link power control mechanism becomes unstable. Small fluctuations in the reverse link load in the carrier can generate large variations of the power received at the base station. In the extreme case that too many users are added to a carrier, the interference generates large burst of errors in the reverse link transmissions, leading to loss of data throughput and large amounts or retransmissions. In the worst case it leads to call drops and discontinuity of service. For instance, when the load is very high, admitting one more voice call may generate enough increase in interference that existing mobiles may drop their links to the base station because they cannot be heard reliably.

The call load in the reverse link should be monitored continuously and be maintained below safety margins to avoid instabilities associated with large fluctuations in the power received at the base station. This is typically done by measuring and comparing the total power received at the base station against a threshold.

The process of controlling the reverse link RF interference is called reverse link overload control, or "overload control." An effective overload control requires accurate measurements of the load at a high rate. In the case of reverse link high speed packet data traffic, the same metric used by an overload control algorithm to grant or deny access, is used to schedule the rate of packet data users requesting RF resources. In the typical case, the scheduler requires a relatively precise measurement of the load in the whole range of the allowed load values. The overload control algorithm, on the other hand, only need to know when the load is near threshold or safety limit. Since the performance of the scheduler depends on the ability to assign data rates very quickly (on the order of 10 milliseconds, which is the minimum duration of a frame to transmit packet data), the scheduler must receive an accurate load metric at a rate of approximately 100 Hz in order to assign the available RF efficiently.

An efficient overload control and packet data scheduler needs an accurate call load metric at a high rate in order to utilize and assign the available RF resources as efficiently as possible. Failure to meet these requirements will degrade the performance of the overload control and scheduler algorithms. This leads to noticeable degradation of the link performance including reduced user and carrier data throughputs, reduced capacity, large latency in the data transmissions, call and sessions drops and discontinuity of service.

Additionally, jammers such as non CDMA or UMTS sources of power that contribute to the RF interference preferably will be dealt with directly by the overload control and the scheduler. Jammers will increase the interference at the base station but typically should not be included in the load calculation because they do not add to the instability of any interference. Therefore, an efficient overload control and scheduler would preferably use a load metric that is capable of measuring the jammer component in the total interference.

The typical metric associated with reverse link loading is the Reverse Signal Strength Indicator (RSSI). As it is well known, the RSSI is not the metric of choice when allocating RF resources, but it provides complementary knowledge of the reverse link RF conditions. For example, when a jammer raises the RSSI and there are no users in the carrier, the jammer may be high enough to bring the RSSI above the blocking threshold in the carrier. If the overload algorithm is based exclusively on the noise rise (RSSI over thermal noise at the receiver), then users requesting RF resources close to the base station will be blocked, even when there is no load in the system and even if the user has sufficient power to overcome the interference. In other words, failure to measure the contribution of a jammer may lead to false alarms in the overload control or underestimating of the rate assigned to packet users. RSSI is not an ideal overload trigger, in part, because it does not distinguish call load interference from jammer interference.

Three main components contribute to the RSSI: thermal noise, jammers and CDMAJUMTS traffic. The thermal noise is the background level of interference present at the receiver in all the RSSI measurements. This measurement usually remains constant during operation of a cell, or at least for a long period of time when compared to the life of a data transmission session. Jammers are external sources of power that contribute to the RSSI but not to the call load. Jammers can change their strength quickly but typically remain constant for long periods of time. Jammers do not respond to power control messages from cells. Examples of jammer sources are "human made noise," or a GSM mobile transmitting in the reverse link in a far cell in the same carrier but with a good path loss to the base station. There is no known way to distinguish thermal noise from jammers for purposes of overload or scheduling control.

The call load component of RSSI, which results from CDMA/UMTS traffic, is divided into two categories: the "active cell" (also known as "same cell") interference and the "other cell" interference. The "active cell" interference corresponds to the amount of power received at the base station from mobiles that are power controlled by the base station. Soft and softer handoff mobiles are included in the active cell interference category. The "other cell" interference is the amount of power from all the other mobiles transmitting in the reverse link carrier that are power controlled by neighbor base stations. These are not controlled by the base station under observation.

In practice, only the call load associated with the "active cell" traffic can be measured. One reason for using the RSSI as a metric for reverse link load management instead of call load is that the call load contribution from "other cells" typically can only be measured using complex and costly-to-implement algorithms. Conventional wisdom was that active call load and other cell load were coupled or correlated. Simulations and testing have shown that assuming a proportional relationship between the active and other cell load is not accurate. This is a significant shortcoming because the other cell term, which is only weakly correlated with the active cell component, contributes to the increase in RF instability of the carrier. The amount of other cell interference can be large, and varies quickly with neighbor cell activity.

The total call load $X^{total}$ is a measure of the CDMA/UMTS RF utilization in the reverse link. For a given sector i, the total call load is given by $$X_i^{total} = \frac{P_{cdma,i}}{WI_{o,i}} = \frac{\sum_{j \in A_i} E_{i,j}}{I_{o,i}} + \frac{\sum_{j \notin A_i} E_{i,j}}{I_{o,i}} \equiv X_i^{act} + X_i^{oc} \quad (1)$$

where $A_i$=the set of all mobiles having an active set that contains sector i;
$P_{cdma,i}$=total power measured at base station i due to all the CDMA/UMTS mobiles transmitting in the carrier;
$I_{o,i}$=total power spectral density measured at base station i in the CDMA/UMTS carrier;
W=CDMA/UMTS carrier bandwidth;
$E_{i,j}$=chip energy of user j measured at base station i;
$X_i^{act}$=active call load measured in sector i due to all the active mobiles in sector i; and
$X_i^{oc}$="other cell" call load in sector i due to mobiles in neighbor sectors of sector i As defined in equation (1), the total call load is a dimensionless quantity of range $0 \leq X_i^{total} \leq 1$. A value of zero means there are no CDMA/UMTS users in sector i. If the total call load value is near 1, then most of the reverse link interference in the carrier is due to CDMA/UMTS mobiles. In this case the system is approaching the pole capacity condition.

The total call load can be separated into the sum of two components: the active and the "other cell" call load as shown in equation (1). Although both quantities can be measured at the base station, in practice only the active component is directly measurable. The "other cell" call load is difficult to determine, because it requires the knowledge of all the user codes that are active in the neighbor cells, which are not known by the base station in observation. Therefore, only a lower bound of the total call load is available, which is equal to the active call load in the carrier.

Since the pole instability depends on the total call load and not on the active call load alone, it is not sufficient to measure the active call load to obtain an accurate metric for overload control and reverse link scheduling. It would be desirable to be able to determine the "other cell" call load component in order to be able to obtain at least an estimate of the total call load.

If the call load metric is estimated incorrectly, or inaccurately, only suboptimal tradeoffs can be achieved when assigning reverse link data rates, while trying to maintain the quality of service for existing users. A realistic model that computes the total call load must take into account rapid variations of the "other cell" interference. Attempts to ignore the "other cell" component in the call load will invariably give an underestimation of the call load, which will have to be compensated to protect the quality of service of voice and data users. This will lead to a sub-optimal tradeoff degrading the individual data throughput, and finally the sector throughput performance. Therefore, there is a need for a reliable method to determine the total call load including the important "other cell" components.

SUMMARY OF THE INVENTION

This invention addresses the need for determining the total call load on a reverse link. This invention also addresses the need for determining a jammer component. With such information, better overload control and better scheduling techniques become possible.

A disclosed exemplary method of communicating includes determining an other cell load component of interference on a reverse link.

One example includes determining a total call load based upon the determined other cell load component and a determined active cell load component.

One example includes determining a jammer component of the reverse link interference based on the determined total call load and a determined reverse signal strength indicator, using a relationship between those components.

The various features and advantages of this invention will become apparent to those skilled in the art from the following detailed description. The drawings that accompany the detailed description can be briefly described as follows.

DETAILED DESCRIPTION

This invention provides an ability to accurately estimate or determine the total call load $X^{total}$ at a high rate. Additionally, this invention provides an ability to estimate or determine the noise floor plus jammer ($N_0$+J) contribution to reverse link interference. These two quantities can strategically be used as the input data for base station algorithms to manage the reverse link RF resources in the air interface. The determined total call load $x^{total}$ and noise floor plus jammer ($N_0$+J) metrics are useful for reverse link interference overload control, scheduling and rate control of data users (e.g. packet data), protecting reverse link coverage, detecting excessive cell interference from neighbor sectors, estimating thermal noise floor, and detecting and reporting external jammers in the carrier, for example. With this invention, more accurate load determination and scheduling is possible compared to previous systems that relied upon RSSI as the control metric.

Figure 1:
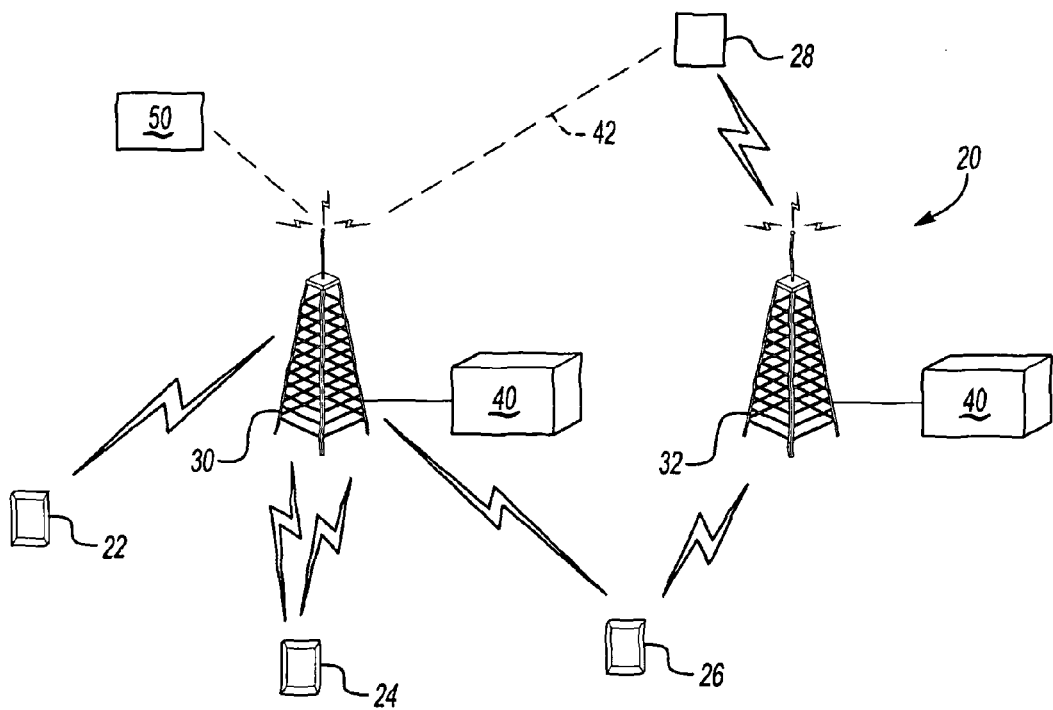
FIG. 1 schematically illustrates selected portions of a wireless communication system incorporating an embodiment of this invention.

FIG. 1 schematically shows selected portions of an example wireless communication system 20. A plurality of mobile stations 22, 24, 26 and 28 communicate with one or more base stations 30, 32. In the illustrated example, the mobile station 22 is communicating with the base station 30. The example mobile station 24 is in a softer handoff mode switching between sectors that are both served by the base station 30. The example mobile station 26 is in a soft handoff mode between the base stations 30 and 32. The example mobile station 28 is in communication with the base station 32.

The example base stations 30 and 32 include a reverse link load control module 40 that includes suitable programming for monitoring the interference level on a reverse link for a given carrier or within a given sector. This description refers to reverse link load control on a carrier. The principles associated with the disclosed example are applicable to more than one carrier or an entire sector. For discussion purposes, this description focuses on the carrier example. Those skilled in the art who have the benefit of this description will realize how the disclosed example is applicable to interference load measurement and control for an entire sector or an entire base station, for example.

The reverse link load control module 40 for the base station 30 performs various functions to determine an amount of interference caused by a current call load and other factors that can influence the amount of interference. In the illustrated example, the mobile stations 22 and 24 are part of the active cell load component for a carrier used by both mobile stations 22 and 24. In the same example, the mobile station 26 is currently controlled by the base station 32. The communications with the base station 30 during the handoff mode are considered part of the active load component for base stations 30 and 32 because the mobile station 26 is controlled by the base stations 30 and 32 for purposes of power management, for example.

In the illustrated example, the mobile station 28 does not communicate intentionally with the base station 30. At the same time, however, signals transmitted by the mobile station 28 schematically shown at 42 are being received at the base station 30 and constitute other cell interference and contribute to the total call load of base station 30. Of course, the mobile station 28 contributes to the total call load of the base station 32.

The illustrated example also includes a jammer 50 that introduces interference at the base station 30.

The load control module 40 is responsible for determining whether to admit a new call and to schedule users for data transmission to allocate resources on a given carrier, for example. In this example, the load control module 40 utilizes a total call load metric for making such decisions. This represents an improvement over techniques that utilized a measured RSSI for the reasons discussed above.

Figure 2:
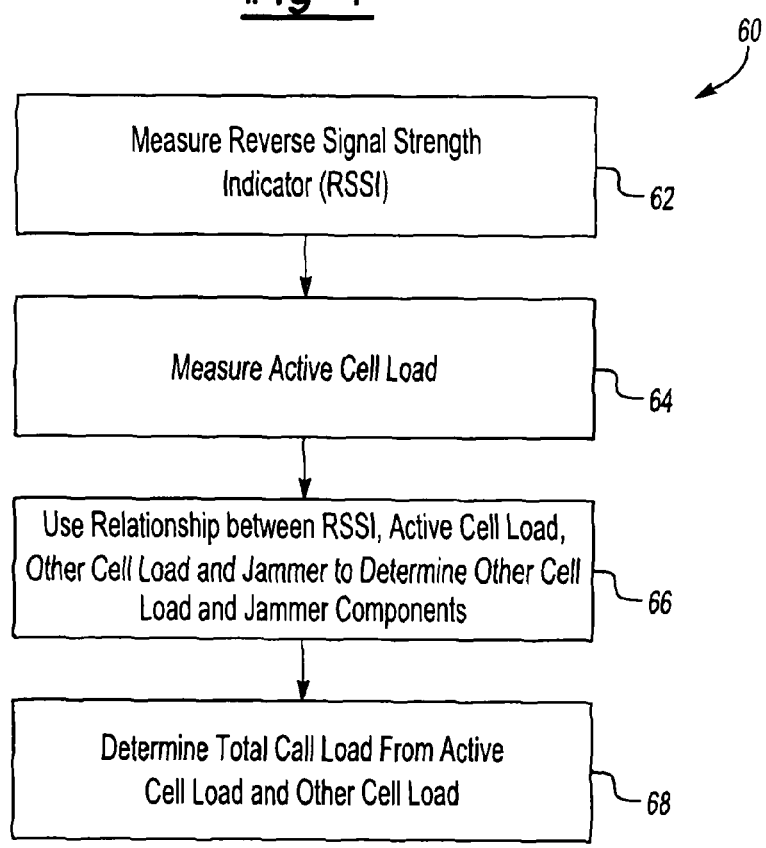
FIG. 2 is a flow chart diagram summarizing one example approach consistent with an embodiment of this invention.

FIG. 2 includes a flow chart diagram 60 summarizing an example approach for using a total call load metric. In this example, the load control module 40 measures the reverse signal strength indicator (RSSI) at 62. This is accomplished in one example using known techniques. At 64, the load control module 40 measures the active cell load component using known techniques. At 66, the load control module 40 utilizes a derived relationship (Equation (2) below) between the RSSI, the active cell load component, an other cell load component and a jammer component to determine the other cell load component and the jammer component. At 68, once the other cell load component has been determined, the active cell load component and the other cell load component are used to determine a total call load for the carrier of interest.

The total call load, the jammer component, or both can then be utilized to determine whether to admit a new call and how to allocate current RF resources for existing users, for example.

The RSSI measured at a base station i is expressed in one example in terms of four components: thermal noise $N^{TH}$, jammer J, active cell $X^{act}$ and other cell $X^{oc}$:

$$RSSI_i = N_i^{TH} + J_i + \sum_{i \in A_j} P_{cdma,j} + \sum_{j \notin A_i} P_{cdma,j} \quad (2)$$

$$= N_i^{TH} + J_i + RSSI_i \lfloor X_i^{act} + X_i^{oc} \rfloor$$

This example includes exploiting the above relationship between the RSSI components for determining the values of the thermal noise plus jammer component $N_i^{TH}+J_i$ and the "other cell" load interference component $X^{oc}$ based on Equation (2) and measurements of $RSSI_i$ and $X_i^{act}$. Once the "other cell" load component is determined, the total call load $X_i^{total}=X_i^{act}+X_i^{oc}$ is known and can be used as a significant and reliable input for overload control and reverse link scheduler algorithms, for example.

One example includes determining an estimate of $N_i^{TH}+J_i$ and $X_i^{oc}$ using simultaneous measurements of $RSSI_i$ and $X_i^{act}$. In one example, RSSI is measured at baseband in the reverse link of the radio, and $X^{act}$ is measured at the channel element ASIC using known techniques. Sampling N sets of these measurements at a high rate, such as every 1.25 msec for CDMA 2000 and every 1.67 msec for 1×EVDO, provides a time correlation between the active cell load and RSSI over a period of the N samples. If the RSSI and $x_i^{act}$ are sampled fast, then the thermal noise plus jammer term can be assumed constant in Equation (2) for the duration of the N samples (i.e., the noise power can be assumed constant and independent of time).

Equation (2) is solved in one example by assuming an average value for the other cell load component $X_i$ in the time interval of the N samples. In this case Equation (2) becomes:

$$RSSI_{i,j}(1-X_{i,j}^{act}) = \overline{N_i^{TH}+J_i} + RSSI_{i,j} \overline{X_i^{oc}} \quad (3)$$

where i=CDMA/UMTS carrier index j=time sampling index, $1 \leq j \leq N$ $\overline{N_1^{TH}+J_i}$=average value of thermal noise plus jammer power to be estimated in the N sample period $\overline{X_i^{oc}}$=average "other cell" load component in the N sample period.

For most cases, N=8 (i.e. 8 sample measurements are used to minimize Equation (4)) is sufficient to obtain good accuracy. This means accurate estimates of total call load and the noise plus jammer component can be obtained every 10 milliseconds. Additional IIR filtering techniques can be used to smooth the estimates, and provide prediction values in future frames.

The average values over the sample period provides an ability to determine the desired metric(s). In one example "determining" the desired metric includes estimating it to a reasonable degree of accuracy to render the metric reliable. This description includes "estimating" as one example technique of "determining" a value. For example, one determined other cell load component is an estimated value.

The left hand side of Equation (3) is a known set of N values measured at the base station i at N consecutive times. These values are based on the measurements of the $RSSI_i$ and $X_i^{act}$. On the right hand side of Equation (3), there are two unknowns to be determined: the average thermal noise plus jammer $\overline{N_i^{TH}+J_i}$ and the average other cell call load $\overline{X_i^{oc}}$. In this example, the previously derived Equation (2), which under the conditions stated above is valid, allows obtaining an estimate of $\overline{N_i^{TH}+J_i}$ and $\overline{X_i^{oc}}$.

In one example, Equation (3) is solved by assuming the following linear model:
$\overline{N_i^{TH}+J_i}$=constant in the N sample interval; and
$\overline{X_i^{oc}}$=constant in the N sample interval.
In this case, the solution can be computed by minimizing the following sum $$\sum_{j=1}^{N} \left[ RSSI_{i,j}(1 - X_{i,j}^{act}) - \overline{N_i^{TH}+J_i} + RSSI_{i,j}\overline{X_i^{oc}} \right]^2 \quad (4)$$

with solutions $$\overline{N_i^{TH}+J_i} = \frac{\left[\left(\sum_{j=1}^{N} RSSI_{i,j}^2\right)\left(\sum_{j=1}^{N} RSSI_{i,j}(1-X_{i,j}^{act})\right) - \left(\sum_{j=1}^{N} RSSI_{i,j}\right)\left(\sum_{j=1}^{N} RSSI_{i,j}^2(1-X_{i,j}^{act})\right)\right]}{\left[N\left(\sum_{j=1}^{N} RSSI_{i,j}^2\right) - \left(\sum_{j=1}^{N} RSSI_{i,j}\right)^2\right]}$$

and $$\overline{X_i^{oc}} = \frac{\left[N\left(\sum_{j=1}^{N} RSSI_{i,j}^2(1-X_{i,j}^{act})\right) - \left(\sum_{j=1}^{N} RSSI_{i,j}\right)\left(\sum_{j=1}^{N} RSSI_{i,j}(1-X_{i,j}^{act})\right)\right]}{\left[N\left(\sum_{j=1}^{N} RSSI_{i,j}^2\right) - \left(\sum_{j=1}^{N} RSSI_{i,j}\right)^2\right]}$$

Another example includes solving Equation (2) using a linear model for the time correlation of the other cell load component $X_i^{oc}$. This example can be considered an enhancement model to the constant other cell load model assumptions, because it allows capturing quick changes of the other cell load for the carrier during the observation period. The linear model of this example accommodates linear changes in the other cell load during the period containing the N samples. In this case the model equations are given by:
$\overline{X_i^{oc}}$=constant in the N sample interval; and
$X_{i,j}^{oc} = \alpha_i + \beta_i(j-1)$ with $1 \leq j \leq N$, where $\alpha_i$ and $\beta_i$ are constant in the N sample interval.

In this example the average other cell load in the N sample period is given by:

$$\overline{X_{i,j}^{oc}} = \frac{1}{N}\sum_{j=1}^{N} X_{i,j}^{oc} = \alpha_i + \frac{\beta_i(N-1)}{2}$$

where
$\overline{N_i^{TH}+J_i}$, $\alpha_i$ and $\beta_i$ are the three parameters obtained by minimizing the sum:

$$\sum_{j=1}^{N} \left[ RSSI_{i,j}(1-X_{i,j}^{act}) - \overline{N_i^{TH}+J_i} + RSSI_{i,j}(\alpha_j + \beta_j(j-1)) \right]^2 \quad (5)$$

This example involves the inversion of a 3×3 system of linear equations. One difficulty in solving Equations (4) or (5) is when there is no time correlation between the active call load and RSSI. This occurs when $X_i^{act} \approx 0$, (i.e., there are no calls in the carrier). In this case it is not possible to separate the other cell load from the thermal noise plus jammer terms. In fact, the solution to Equations (4) or (5) when $X_i^{act}$ is small is given by $\overline{N_i^{TH}+J_i}=0$ and $\overline{X_i^{oc}}=1$, which corresponds to pole capacity and is incorrect. Accordingly, in one example, when the measured values of $X_i^{act} \approx 0$, the solutions to Equations (2), (4) and (5) are biased and are not used.

In one example, for values of $X_i^{act} < 0.4$, the correlations between the active call load and RSSI are too weak to allow separating the other cell load $X^{oc}$ from the thermal noise plus jammer $N^{TH}$ and J component in Equation (2). In this example, if the measured active call load $X_i^{act} < 0.4$ and assuming the thermal noise plus jammer power is kept constant during the N samples period, the other cell load can be estimated by using the fact that the standard deviation 6 of the "other cell" interference power is proportional to the "other cell" interference power:

$$\sigma[RSSI_i X_i^{oc}] = \sigma[RSSI_i(1-X_i^{act}) - N_i^{TH} - J_i] = \sigma[RSSI_i(1-X_i^{act})] \approx \kappa E_i^{oc} \quad (6)$$

where $\kappa$ is a constant and $$E_i^{oc} = \overline{X_i^{oc}} \frac{1}{N}\sum_{j=1}^{N} RSSI_{i,j}$$

The following equation provides an estimate for determining the other cell load $X^{oc}$ when the active call load $X^{act}$ is less than 0.4:

$$\overline{X_i^{oc}} \approx \frac{\sigma[RSSI_i(1-X_i^{act})]}{\frac{\kappa}{N}\sum_{j=1}^{N} RSSI_{i,j}}$$

Given the determined estimate of the other cell load $X^{oc}$, the total call load $X^{TOTAL}$ is obtained using Equation (2), which provides an estimate of the thermal noise plus jammer component $N_i^{TH}+J_i$.

The preceding description is exemplary rather than limiting in nature. Variations and modifications to the disclosed examples may become apparent to those skilled in the art that do not necessarily depart from the essence of this invention.

The scope of legal protection given to this invention can only be determined by studying the following claims.

We claim:

1. A method of communicating, comprising
using a base station controller for:
determining an active cell load of a reverse link in a cell a plurality of times within a sampling period;
determining a reverse signal strength indicator (RSSI) a corresponding plurality of times within the sampling period wherein there is a time correlation between each determined active cell load and a corresponding determined RSSI;
determining an other cell load component of interference associated with the reverse link for the sampling period based upon
(i) a first relationship that includes an average of a thermal noise plus jammer component of the interference during the sampling period if the active cell load is above a selected threshold or
(ii) a second, different relationship that does not include the thermal noise plus jammer component for determining the other cell load component if the active cell load is below the selected threshold.

2. The method of claim 1, comprising determining a total call load based on the determined other cell load component and the determined active cell load component.

3. The method of claim 2, comprising determining whether to allow a new call based upon the determined total call load.

4. The method of claim 2, comprising determining how to allocate resources associated with the reverse link based upon the determined total call load.

5. The method of claim 2, comprising determining a jammer component of the interference based on the determined total call load and a determined reverse signal strength indicator.

6. The method of claim 5, comprising determining the reverse signal strength indicator using $$RSSI_i = N_i^{TH} + J_i + RSSI_i(X_i^{act} + X_i^{oc})$$

wherein
RSSI is the reverse signal strength indicator;
$N^{TH}$ is a thermal noise component;
J is the jammer component;
$X^{act}$ is the active cell load; and
$X^{oc}$ is the other cell load component.

7. The method of claim 5, comprising:
determining the reverse signal strength indicator and the active cell load at each of a plurality of sample times;
determining an average value of the other cell load component for a period corresponding to the same times; and
determining an average value of the jammer component for a period corresponding to the sample times.

8. The method of claim 7, comprising:
determining the average values by assuming the average values are constant during the period and determining a minimum of:

$$\sum_{j=1}^{N} \left( RSSI_{i,j}(1 - X_{i,j}^{act}) - \overline{N_i^{TH} + J_i} + RSSI_{i,j}\overline{X_i^{oc}} \right)^2$$

wherein $\overline{N^{TH}+J}$ is an average noise plus jammer value; and
$\overline{X^{oc}}$ is an average other cell load component value.

9. The method of claim 7, comprising:
assuming the average value of the jammer component remains constant during the period; and
determining a linear variation of the average value of the other cell load component.

10. The method of claim 9, comprising determining the linear variation by determining a minimum of:

$$\sum_{j=1}^{N} \left[ RSSI_{i,j}(1 - X_{i,j}^{act}) - \overline{N_i^{TH} + J_i} + RSSI_{i,j}(\alpha_j + \beta_j(j-1)) \right]^2$$

wherein α and β are constants.

11. A method of communicating, comprising using a base station controller for:
determining an active cell load of a reverse link in a cell, the active cell load being an amount of power received at a base station from mobile stations that are power controlled by the base station;
determining an other cell load component of interference associated with the reverse link. the other cell load component being an amount of power received at the base station on the reverse link from mobile stations that are not power controlled by the base station;
using the active cell load and the other cell load component for determining how to allocate resources of the reverse link;
determining a reverse signal strength indicator; and
using a first time-dependent relationship between the reverse signal strength indicator, the active cell load and the other cell load component for determining the other cell load component if the active cell load is above a threshold and using a second time-dependent relationship between the reverse signal strength indicator, the active cell load and the other cell load component for determining the other cell load component if the active cell load is below the threshold.

12. The method of claim 11, comprising
determining the other cell load component as a separate quantity from the active cell load.

13. The method of claim 11, wherein determining the other cell load component includes using a relationship that depends on determining a jammer component of the interference for determining the other cell load component.

* * * * *